US006671885B2

United States Patent
Viggiano (10) Patent No.: US 6,671,885 B2
(45) Date of Patent: Jan. 6, 2004

(54) HEADWEAR FOR SECURING ARTICLES

(76) Inventor: Darrin Viggiano, 62 Society Hill Way, Tinton Falls, NJ (US) 07724

( * ) Notice: Subject to any disclaimer, the term of this patent is extended or adjusted under 35 U.S.C. 154(b) by 0 days.

(21) Appl. No.: 09/922,056

(22) Filed: Aug. 3, 2001

(65) Prior Publication Data

US 2003/0024033 A1 Feb. 6, 2003

(51) Int. Cl.⁷ ................................................. A42B 1/24
(52) U.S. Cl. ............................ 2/209.13; 2/195.1; 2/918
(58) Field of Search ............................ 2/209.13, 195.1, 2/10, 171, 266, 918; 351/155

(56) References Cited

U.S. PATENT DOCUMENTS

| | | | |
|---|---|---|---|
| 264,574 A | 9/1882 | Shaw | |
| 857,838 A | 6/1907 | Shaw | |
| 1,514,111 A | 11/1924 | Sutton | |
| 1,647,124 A | 11/1927 | Briggs | |
| 1,664,255 A | * 3/1928 | Lesser | 2/195.5 |
| 2,557,552 A | * 6/1951 | Martin | 2/10 |
| 2,744,256 A | * 5/1956 | Slotkin | 2/209.13 |
| 2,766,657 A | 10/1956 | Nathan | |
| 4,179,753 A | 12/1979 | Aronberg et al. | |
| 4,312,076 A | 1/1982 | Gamm | |
| 4,451,935 A | 6/1984 | Henschel | |
| 4,636,048 A | 1/1987 | Jones | |
| 5,117,510 A | * 6/1992 | Broussard et al. | 2/209.3 |
| 5,539,929 A | 7/1996 | Revson | |
| 5,581,813 A | 12/1996 | Henschel | |
| 5,734,993 A | * 4/1998 | D'Oca | 2/175.3 |
| 5,860,167 A | 1/1999 | Lizio | |
| 5,867,874 A | 2/1999 | Simpson | |
| 5,894,604 A | * 4/1999 | Crabb et al. | 2/209.13 |
| 6,115,843 A | * 9/2000 | Travalgia | 2/171 |
| 6,185,748 B1 | 2/2001 | DeChambeau | |
| 6,237,159 B1 | 5/2001 | Martin | |
| 6,282,721 B1 | * 9/2001 | Travalgia | 2/171 |
| 6,298,495 B1 | * 10/2001 | Totani | 2/209.13 |

* cited by examiner

*Primary Examiner*—Rodney M. Lindsey
(74) *Attorney, Agent, or Firm*—Catalina & Associates (57) ABSTRACT

A hat utilizing an internal means for securing items to the exterior of the hat. A preferred embodiment of the present invention is a baseball style cap with an internal means for attaching or securing sunglasses above the brim of the cap, where the sunglasses are readily secured by inserting the temples through slits in the cap. Because the securing means is internal, the hat maintains its overall aesthetic appearance. In one embodiment, the internal means for securing the eyeglasses or other object is an internal lining of a semi-rigid, but flexible material, such as buckram, neoprene or stretch fabric, with a corresponding slit in that material through which the article is inserted. In another embodiment, the internal means comprise of two strips of synthetic materials that adhere when pressed together, commonly sold under the trademark VELCRO™, affixed to each side of the slit opening.

29 Claims, 6 Drawing Sheets

HEADWEAR FOR SECURING ARTICLES

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A SEQUENCE LISTING

Not applicable.

BACKGROUND OF THE INVENTION

1. Field of the Invention

The present invention relates to wearing apparel having means to attach and secure articles, and more particular, headwear for securing articles such as glasses. A preferred embodiment of the present invention is a baseball style cap with an internal means for attaching or securing sunglasses to the cap above the brim of the cap, where the sunglasses may be readily secured and withdrawn therefrom.

2. The Prior Art

As is well known, many persons use sunglasses to shade their eyes when engaging in outdoor activities or sports such as jogging, running, tennis, fishing, boating and other outdoor recreations. Often times, the individual wearing the sunglasses also wears a hat to further protect himself or herself from the harmful rays of the sun, or to keep hair from being blown about in the wind. At times, a person wearing both sunglasses and a hat may need to remove the sunglasses for a particular reason, such as when entering a shadowed area or the interior of the building or for any other of a variety of reasons. Problems arise because there is often no convenient location to temporarily store the sunglasses in a secure manner. Many persons will often hook the temple of the sunglasses on the collar of a shirt. However, sunglasses hooked to the collar of a shirt are not secure, may fall off and get lost. Moreover, it is not convenient to readily remove the sunglasses with one hand to place them back on the nose and ears for wearing.

Similarly, one playing or working outdoors and wearing a hat may need to temporarily secure an object for ready retrieval. One example is a pencil. However, because the individual is wearing a hat, the pencil does not readily fit behind the ears and the use of a pant pocket is often cumbersome if not at all practical.

In the past, many efforts have been made for the convenient storage or securing of eyeglasses and other articles on hats for immediate and ready retrieval. However, unlike the present invention, most of the past efforts involve cumbersome external apparatus or other external means, which detract from the overall aesthetic appearance of the hat.

Other prior attempts to utilize an internal means for securing the article or sunglasses are often impractical, as these disclosures involve the sealing of the article within a pocket type receptacle thereby requiring the use of two hands to open or unseal the pocket. Other attempts utilizing receptacles are also impractical in that the article is not very secure when attached to the hat and may readily fall out, especially when the hat is removed.

The present invention uses an internal means of securing the sunglasses or other articles to the exterior of the hat. This is accomplished by a slit opening in the hat thereby providing access to the internal securing means. When the sunglasses or other articles are removed from the internal securing means, the slit opening returns to its former shape and is barely noticeable and almost invisible. The means used to secure the eyeglasses or other articles securely hold the objects in place during all types of vigorous activities such as jogging, tennis, cycling, fishing and other sports and recreation. Moreover, the hat may be removed and the article or sunglasses remain secured to the hat.

As noted, past attempts to create a convenient means for securing and retrieving sunglasses and other articles involve unsightly external modifications to the hat. For example, U.S. Pat. No. 5,860,167 discloses a hat with numerous unsightly external receptacles sewn about or otherwise attached externally to the cap. The receptacles, while providing a means for securing articles, including sunglasses, detract from the overall aesthetic appearance of the hat. Moreover, when the sunglasses or articles are removed, the external receptacles remain visible and aesthetically displeasing.

U.S. Pat. No. 4,179,753 teaches an encircling band with an unsightly clip above the brim of a visor or a brim of a cap. Not only is removal or retrieval of the sunglasses somewhat cumbersome with this disclosure, but again, the large clip on the front of the cap or visor remains conspicuously noticeable when the glasses are removed.

U.S. Pat. No. 5,867,874 discloses a clip like implement holder for securing the temples of the sunglasses. Although the clip can be removed from the cap, the clip is nonetheless external and unsightly when in use.

An extremely cumbersome and unsightly apparatus for holding eyeglasses is disclosed in U.S. Pat. No. 4,636,048. The primary objective of this disclosure, however, is to enable a person to utilize eyeglasses without having the eyeglasses contact the nose and ears.

Other types of devices have been utilized for supporting eyeglasses on the head of a wearer, such as is shown in U.S. Pat. No. 2,766,657, which is for glasses which are especially provided with a clip to engage the hair and support the spectacles; another such device is disclosed in U.S. Pat. No. 1,647,124; and, in the past, eyeglasses have been connected to hats in various ways, such as shown in U.S. Pat. No. 264,574 with a hinge connection, as is also typical of U.S. Pat. No. 857,838 and U.S. Pat. No. 1,514,111.

Various other forms of headwear for use while playing various sports have been patented. Many of these hats include pockets for storing and displaying articles. For example, U.S. Pat. No. 1,664,255 discloses a hat with a strip of cloth sewn into the side and divided into a number of small pockets. Unfortunately, the articles do not fit snuggly in the pockets and they can fall out when the hat is removed. One solution is suggested in U.S. Pat. Nos. 2,744,256, 4,312,076, 4,451,935, and 5,539,929, which all disclose hats with sealable pockets. The shortcomings with these designs are that the stored articles are no longer visible and an extra step of having to open the pocket is needed to remove the articles. U.S. Pat. No. 5,581,813 discloses a hat with transparent pockets so that the articles are visible. However, like the hat of U.S. Pat. No. 1,664,255, the articles can fall out when the hat is removed.

A more recent disclosure of headwear utilizing an internal means for securing the temples of eyeglasses is set forth in U.S. Pat. No. 6,237,159 B1. Although the patent depicts three drawings of three different embodiments of the invention, only that embodiment disclosed in FIG. 3 is claimed. In this embodiment, the internal means for receiving the temples of the glasses is an internal headband, commonly found in almost all baseball caps. The upper edge of the internal headband is stitched to each side of the crown portion of the cap, from the point of insertion in the crown to a point approximately three inches toward the rear end of the crown.

Although U.S. Pat. No. 6,237,159 B1 seemingly addresses some of the shortcomings of the prior art discussed above, that disclosure nonetheless retains some disadvantages to the present disclosure. As the patent itself states, the disclosure of U.S. Pat. No. 6,237,159 B1 is essentially only effective with glasses having a straight end piece temple. By far, most glasses, especially sunglasses, consist of temples with a bend or curve at each end distal to the lens portion of the glasses for adequately securing the temples around the ears, thereby allowing the user to wear the glasses. Thus, the disclosure claimed in U.S. Pat. No. 6,237,159 B1 is not well suited for the vast majority of sunglasses manufactured and marketed world wide. In addition, the "pocket" or "sleeve" approach claimed in U.S. Pat. No. 6,237,159 B1 for securing the glasses may still allow for disengagement of the glasses during rigorous activity or when the cap is removed.

Despite the number of different disclosures related to securing articles, especially sunglasses, to hats, there remains a need for a hat or headwear that accomplishes the following objectives: 1) to securely and visibly hold the articles or sunglasses to the exterior of the hat; 2) to securely and visibly hold the articles or sunglasses without unsightly and/or cumbersome external receptacles, hinges, clips or other external modifications to the hat; 3) to securely and visibly hold the articles or sunglasses through the use of an internal securing means; 4) to allow for convenient and ready attachment (securing) and retrieval of the articles or sunglasses with one steady motion; and 5) to provide for an internal means for securing the articles or sunglasses that, upon removal or retrieval of the sunglasses or articles, is barely noticeable, almost invisible, such that the overall aesthetic design of the hat is maintained.

Unlike the prior art, the present version of the invention accomplishes all of the above objectives.

SUMMARY OF THE INVENTION

The present invention is directed to a headwear for securing articles or sunglasses to the exterior of the hat through the use of an internal securing means and that satisfies the needs identified above. In particular, the primary objectives of the present invention are to provide an item of headwear comprised of a hat that 1) securely and visibly holds the articles or sunglasses to the exterior of the hat; 2) securely and visibly holds the articles or sunglasses without unsightly and/or cumbersome external receptacles, hinges, clips or other external modifications to the hat; 3) that securely and visibly holds the articles or sunglasses through the use of an internal securing means; 4) allows for convenient and ready attachment (securing) and retrieval of the articles or sunglasses with one steady motion; and 5) provides for an internal means for securing the articles or sunglasses that, upon removal or retrieval of the sunglasses or articles, the securing means is barely noticeable, almost invisible, such that the overall aesthetic design of the hat is maintained.

The item of headwear having features of the present invention is comprised of three essential elements. The first element is the actual hat to be worn on the head. The hat may consist of a baseball type cap, a fisherman's "bucket" hat, or any other of a variety of hats. The second primary element of the present invention is at least one slit opening in the hat, through which the article to be secured, whether it be a pencil or the temple of sunglasses, is inserted. The slit, when not in use, is barely noticeable and may appear invisible. This is especially so in the preferred embodiment of the present disclosure where the slit is located on a seam in the crown portion of the baseball cap. Inserting the article through the slit into the interior of the hat provides access to the third primary element of the present invention: an internal means for securing the article inserted through the slit. Once secured by the internal securing means, the article or sunglasses are now visibly attached to the exterior of the hat even though the means for securing the articles or sunglasses is internally located and cannot be seen or detected. Significantly, the aesthetic appearance of the hat is not distorted.

There has thus been outline, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto, In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent construction insofar as they do not depart from the spirit and scope of the present invention.

Further, the purpose of the foregoing abstract is to enable the U.S. patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

The internal securing means has two basic embodiments: 1) an internal lining comprised of a layer of a semi-rigid but flexible material, affixed to the inside surface of the hat circumferentially around the slit opening; and 2) two strips of VELCRO™, affixed to each side of the slit opening, whereby the VELCRO™, when compressed around the article inserted through the slit opening (such as the temples of eyeglasses), secures the article to the hat.

The first embodiment of the internal securing means discloses a lining of a layer of a semi-rigid, but flexible material, affixed to the inside surface of the hat circumferentially around the slit opening in the hat. The lining may be comprised of materials such as buckram, neoprene, stretch fabric, or any other material that is semi-rigid, thereby lending support and stiffness for securing the article, but yet flexible enough to be shaped and contoured to the design of the hat. The internal lining is affixed to the internal surface of the hat by processes such as stitching, gluing or other means readily known to those skilled in the art. Preferably, the entire surface area of the internal lining is in direct contact with and affixed to the internal surface of the hat.

The flexibility in the material used to line the internal surface of the hat allows the hat to maintain its natural shape. The internal lining also contains a slit opening that aligns directly with the slit opening in the hat. When the article is inserted through the slit in the hat, and then through the slit in the semi-rigid lining, the stiff nature of the lining causes it to grab or pinch around the article inserted. In the case of a lining of stretch fabric or neoprene, the nature of those materials also "grabs" the article inserted. Because it is semi-rigid and capable of maintaining its own shape and form, the lining securely holds onto the article inserted, even when the hat is removed.

As with the case to attach or secure sunglasses to a hat such as a baseball cap, two such slits are required in the front crown section of the cap above the brim, with two internal securing means associated with each slit. The result is that sunglasses can be removed from the face by the wearer, and then easily guided into the two slits for each corresponding temple of the sunglasses. The natural round shape of the baseball cap is especially suited for guiding the temples into the slits, which preferably, are located along a seam line in the baseball cap.

The second embodiment of the internal securing means consists two strips of synthetic materials that adhere when pressed together, commonly sold under the trademark VELCRO™, affixed to each side of the slit opening, whereby the VELCRO™ strips, when compressed around the article inserted through the slit opening (such as the temples of eyeglasses), secure the article to the hat. This is an especially preferred method for securing sunglasses to the hat during extreme rigorous activity—such as fishing from a boat in rough water—as the compressed VELCRO™ strips form an exceptionally strong bond around the inserted article.

These and other features, aspects, and advantages of the present invention will become better understood with reference to the following description, appended claims and accompanying drawings.

BRIEF DESCRIPTION OF THE DRAWINGS

For a fuller understanding of the nature and object of the present invention, reference is made to the accompanying drawings, wherein:

FIG. 1 demonstrates the invention in use wherein glasses are secured to the baseball cap.

FIG. 6 is a front view drawing of a bucket hat incorporating certain embodiments of the present invention, demonstrating eyeglasses secured to the front portion of the hat. In FIG. 6, the internal securing means comprise two strips of VELCRO™.

DETAILED DESCRIPTION OF THE PREFERRED EMBODIMENTS

Figure 1:
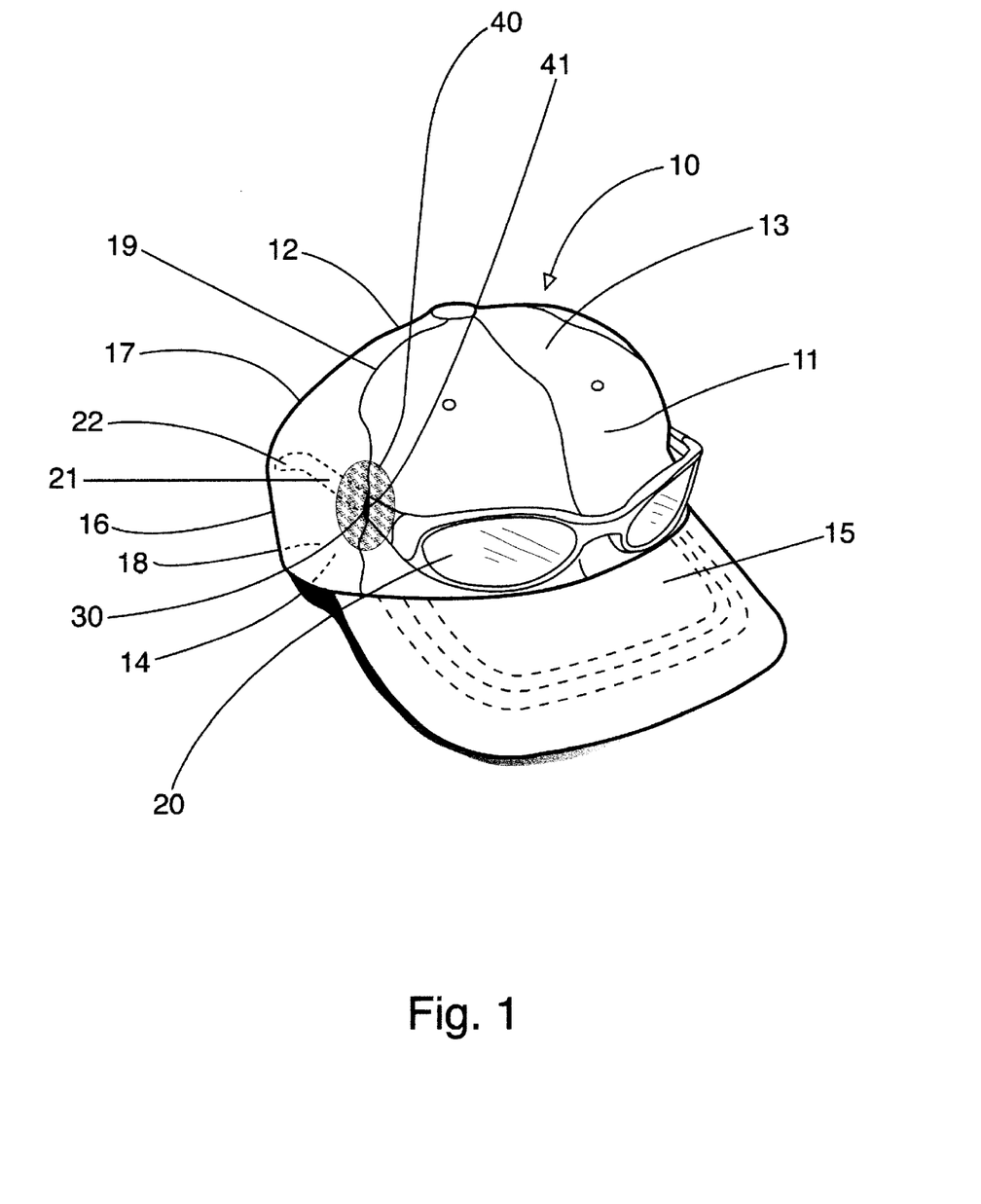
FIG. 1 is a perspective drawing of a baseball type cap incorporating certain embodiments of the present invention, in particular, the embodiment referred to above wherein the internal securing means consists of an internal lining of a semi-rigid, but flexible material, affixed to the internal surface of the cap.

A preferred embodiment of the present invention is illustrated in FIG. 1 and is generally designated as a baseball style cap 10. Cap 10 comprises generally of a crown portion 16, which is further comprised a front portion 11 and a rear portion 12. Cap 10, and in particular, crown 16, is further comprised of an exterior surface portion 13 forming the exterior 17 of the cap, and an interior portion 18 comprising of an interior surface 14. The cap 10 of FIG. 1 further consists of a bill portion 15.

The present disclosure in FIG. 1 is comprised of a front slit opening 30, through which the article, or an element of the article, to be secured is inserted. The slit 30 is preferably located on a seam 19 where it is less noticeable. The article generally being secured in FIG. 1 is a pair of eyeglasses 20. The temple of the eyeglasses 21 is inserted through front slot 30 into the interior portion 14 of the crown 16.

The article inserted through slit 30 is secured by an internal securing means. The internal securing means disclosed in FIG. 1 is comprised of a sufficient amount of an internal lining 40, comprised of a semi-rigid but flexible material, affixed to the internal surface 14 of the crown 16 circumferentially around the slit opening 30. The internal lining 40 is comprised of a corresponding slit opening 41 that is directly aligned with the slit 30. Because the internal lining 40 is comprised of a semi-rigid, but flexible material, when the article inserted, as in the case of FIG. 1 the temples 21, the internal lining 40 clamps down on the temples 21, thereby securely attaching the eyeglasses 20 to the exterior portion 13 of the hat 10.

The semi-rigid, but flexible material used for the internal lining 40 includes buckram, neoprene, stretch fabric, or any other similar materials known to those skilled in the art. FIG. 1 demonstrates the use of buckram as the internal lining 40. The internal lining 40 is affixed to the internal surface 14 of the hat 10 through stitching, gluing, heat pressing, or affixed in any number of ways known to those skilled in the art. Preferably, the entire surface area of the internal lining 40 is in direct contact with and affixed to the internal surface 14 of the hat 10.

As noted, the internal securing means disclosed in FIG. 1 is comprised of a sufficient amount of an internal lining 40, comprised of a semi-rigid but flexible material, affixed to the internal surface 14 of the crown 16 circumferentially around the slit opening 30. The amount of the internal lining 40 required depends on the nature of the material used and the nature of the fabric comprising the hat 10. As shown in FIG. 1, a preferred embodiment of the present invention comprises an internal lining 40 affixed to the internal surface 14 extending at least one inch in a radial direction from the slit opening in the lining.

FIG. 1 further illustrates the use of the slit 30 and the corresponding slit 41 in the internal lining 40 along an existing seam 19 in the crown portion 16 of the hat. Using the seam allows the slit 30 and the corresponding slit 41 to remain barely noticeable, thereby maintaining the aesthetic integrity of the hat 10.

The use of a semi-rigid, but flexible material for the internal lining 40 not only provides an internal means for securing the eyeglasses 20, but the material also does not distort the aesthetic appearance of the hat 10.

Figure 2:
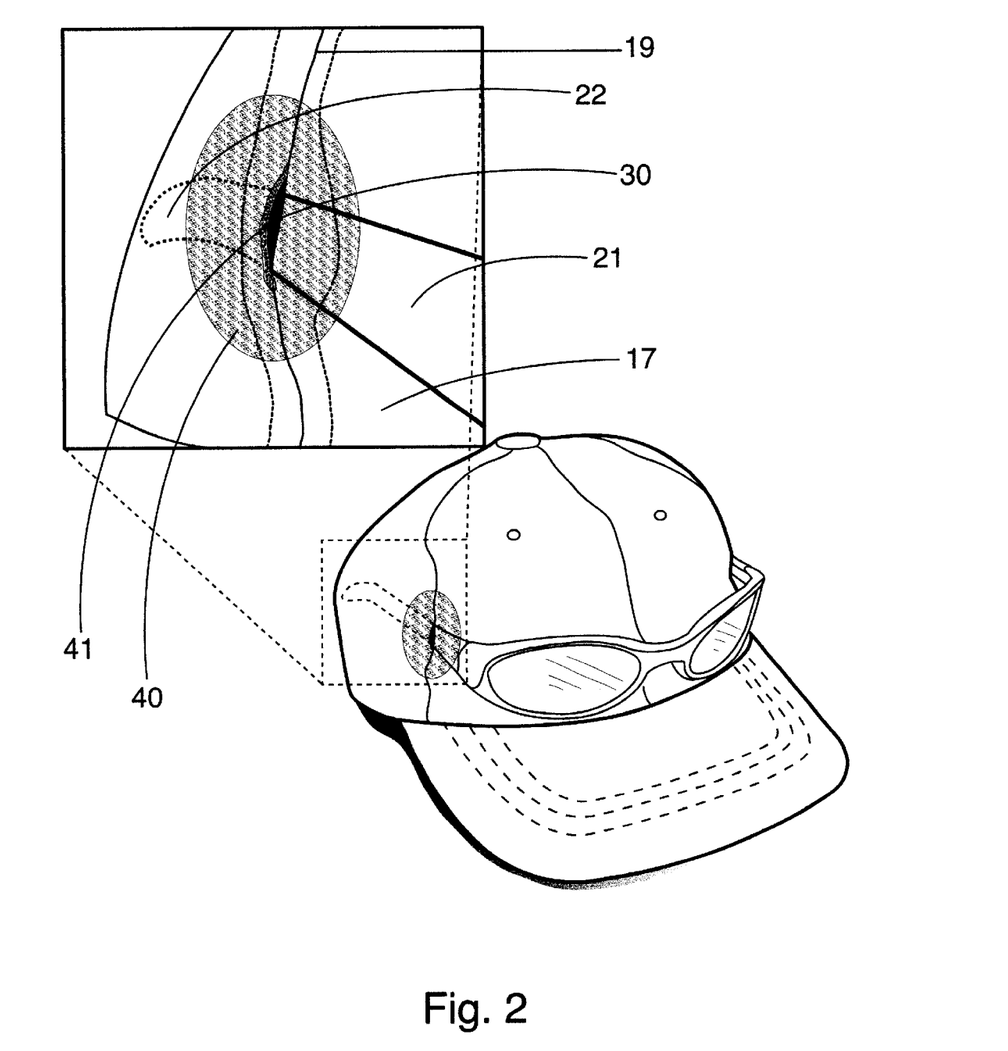
FIG. 2 is an exploded perspective view detailing the internal securing means depicted in FIG. 1.

FIG. 2 is an exploded perspective view detailing the internal securing means as shown in FIG. 1. The temples 21 are inserted through the slit 30 located on the seam 19 of the hat. FIG. 2 further shows the internal lining 40 affixed to the internal surface of the hat. The internal lining slit 41 is directly aligned with the slit opening 30. Unlike the prior art, the present invention allows for securing glasses where the temples are curved 22 at their distal portion.

Figure 3:
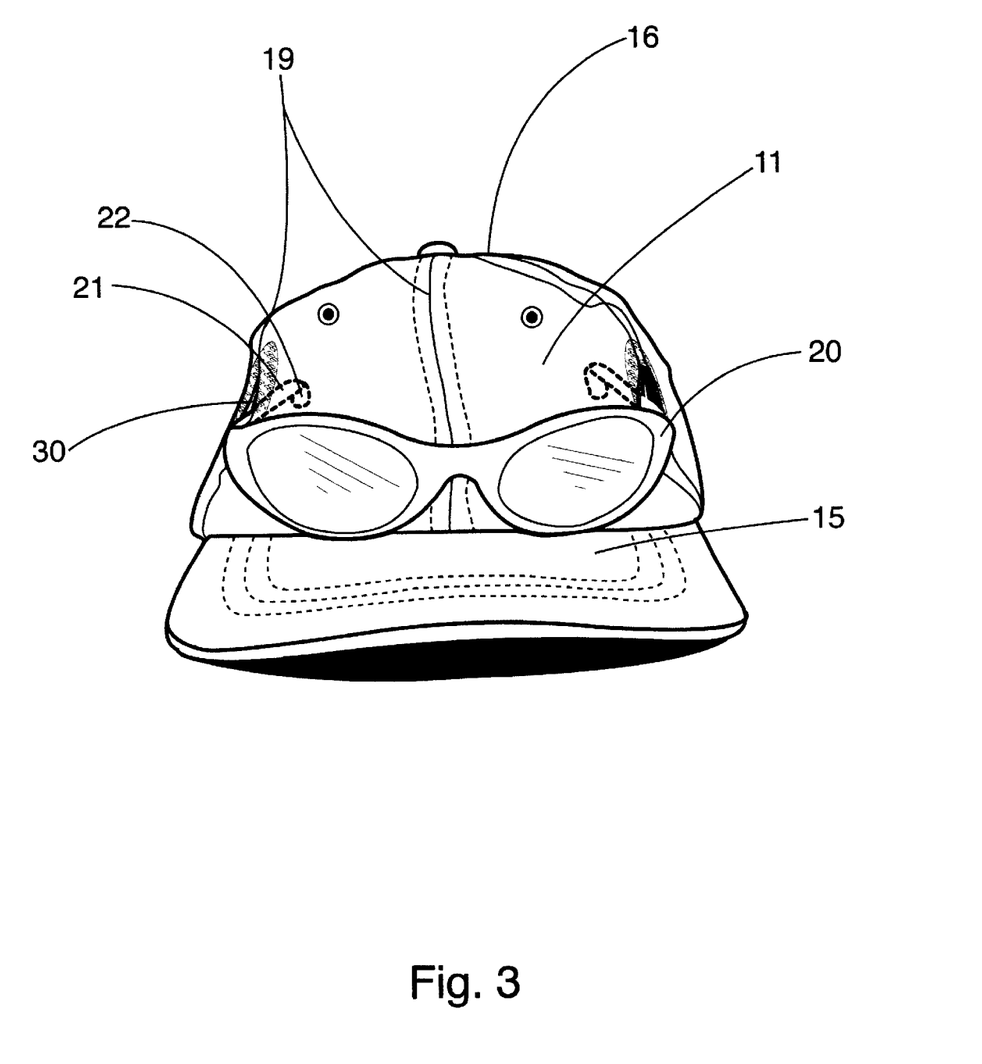
FIG. 3 is a front view drawing of a baseball type cap incorporating certain embodiments of the present invention, demonstrating eyeglasses secured to the front portion of the crown of the cap.

FIG. 3 demonstrates the disclosure in use from a front perspective. In FIG. 3, the eyeglasses 20 are secured to the front portion 11 of the exterior 13 of the hat 10. The temples 21 are inserted through both front slits 30 and are secured by the corresponding slits 41 in the internal lining 40 affixed to the interior surface 14 of the crown portion 16. Once secured by the internal securing means, in this case the internal lining 40 and the corresponding slits 41 in the lining, the article or sunglasses 20 are now visibly attached to the front portion 11 of the exterior 13 of the hat even though the means for securing the articles or sunglasses is internally located and cannot be seen or detected.

Figure 4:
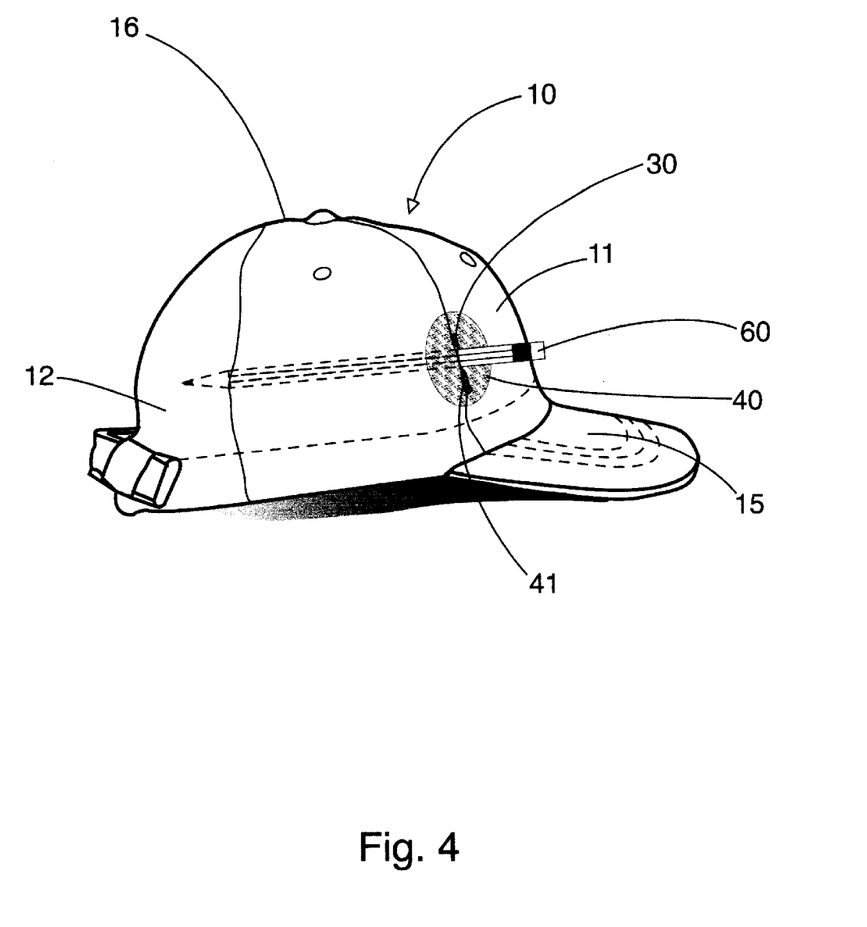
FIG. 4 is a side view drawing of a baseball type cap incorporating certain embodiments of the present invention, demonstrating a pencil secured to the front portion of the crown of the cap.

FIG. 4 is a side view perspective of the disclosure in full use wherein a pencil 60 is secured to the hat. In FIG. 4, the pencil 60 is secured through a slit 30 in the front portion 11 of the hat 10. The pencil 60 is inserted through a front slit 30 and is secured by the corresponding slit 41 in the internal lining 40 affixed to the interior surface 14 of the crown portion 16. Once secured by the internal securing means, in this case the internal lining 40 and the corresponding slit 41 in the lining, the article or in this case, a pencil 60, is now visibly attached to the front portion 11 of the exterior 13 of the hat even though the means for securing the articles or sunglasses is internally located and cannot be seen or detected. Because the internal lining 40 is made of a semi-rigid, but flexible material, the pencil 60 is held firmly in place, yet the hat maintains its same overall aesthetic appearance. Moreover, the means for securing the pencil, because it is internally located, cannot be seen or detected.

Figure 5:
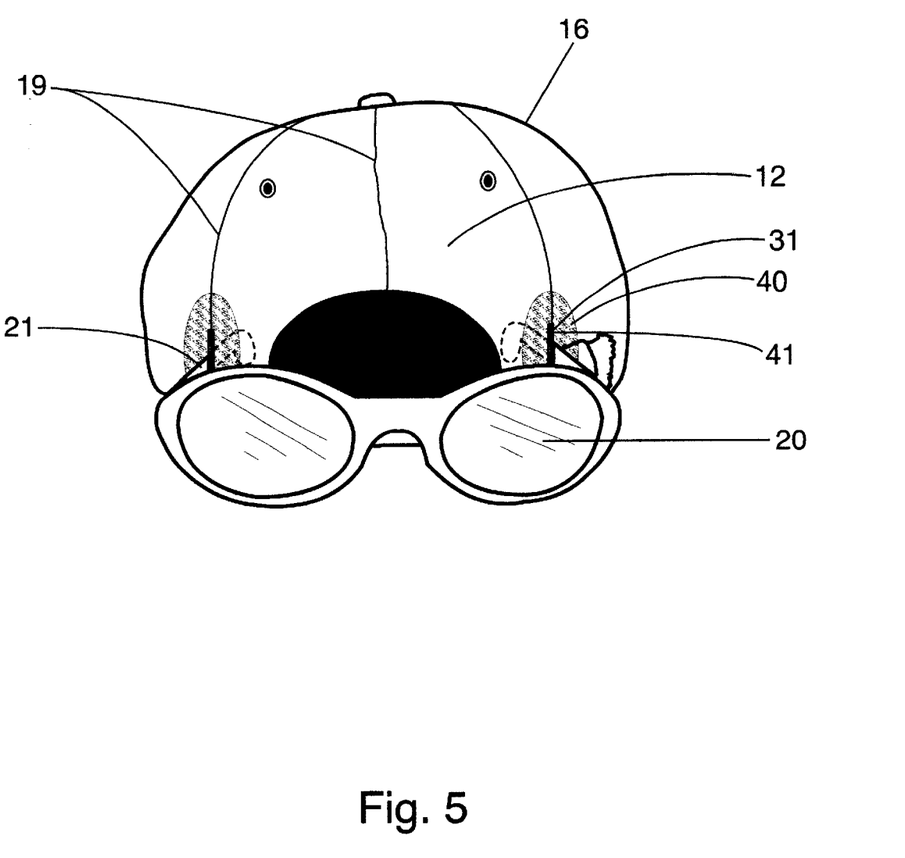
FIG. 5 is a back view drawing of a baseball type cap demonstrating a particular embodiment of the present invention where eyeglasses may be secured to the back portion of the crown of the cap when the cap is worn backwards.

FIG. 5 demonstrates an embodiment of the disclosure where glasses 20 are secured to the back of the baseball style cap, so that the glasses can be secured above the forehead when the hat is worn backwards. As with the front slits 30, this embodiment incorporates a slit 31 in the rear portion 12 of the hat. Again, the slit 31 is preferably located on seam 19 so that it is less noticeable. Affixed to the interior surface of the hat is the internal securing means, in this case an internal lining of a semi-rigid, but flexible material 40. As with the front view perspective, the internal lining 40 affixed to the internal surface of the rear portion of the cap also comprises a corresponding slit 41 directly aligned with the slit 31. In this manner, the article inserted through slit 31 is held firmly in place by the internal lining 40.

Figure 6:
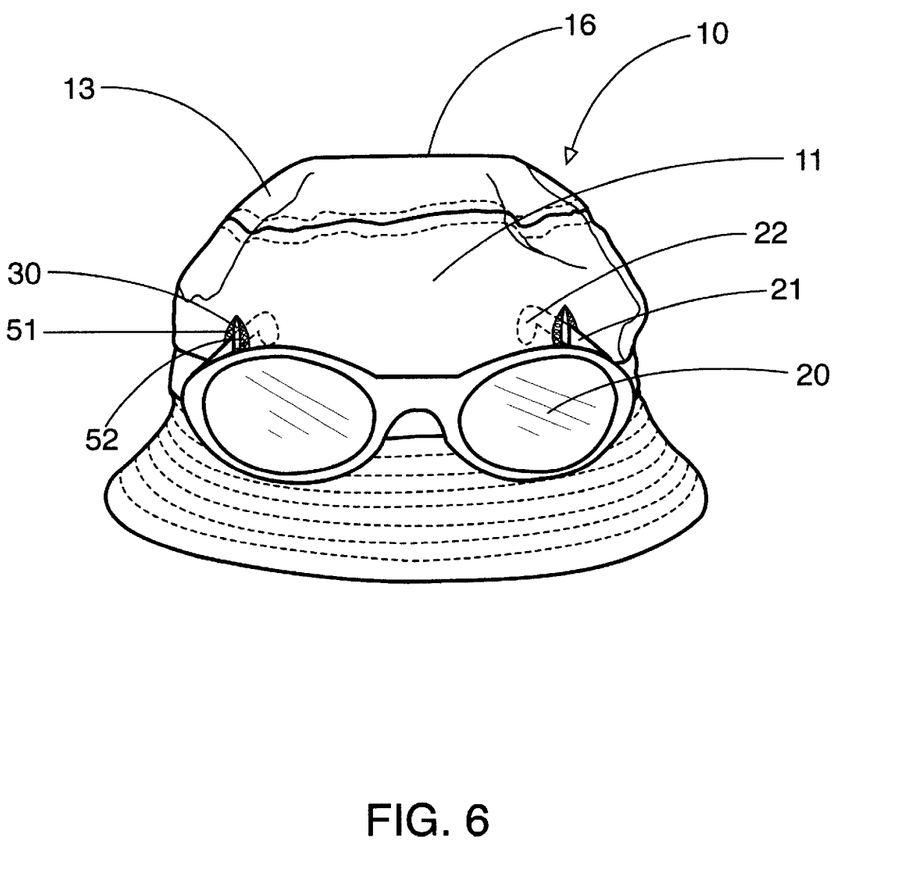

In FIG. 6, a "bucket hat" 10 is shown securing glasses 20. In this particular embodiment, the internal securing means is comprised of two strips of a synthetic material that adhere when pressed together, commonly sold under the trademark VELCRO™. Internally affixed to one side of the slit 30 is a strip of VELCRO™ 51 and internally affixed to the opposite side of slit 30 is the corresponding strip of VELCRO™ 52. In order to secure the glasses 20, the temples 21 of the glasses 20 are inserted through slits 30 in the hat 10. The disclosure allows for securing glasses with temples that are straight or temples that are curved 22, as is the case with most, if not all, glasses. After the temples of the glasses are inserted through strips 30 the strips of VELCRO™ internally affixed on each side of the slit are then compressed around the object inserted, in this case the temples, thereby securing the glasses 20 to the front portion 11 of the hat. The VELCRO™ strips are affixed to the interior of the hat by stitching, glue or any other similar method commonly known to those skilled in the art.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. Headwear for securing articles, the headwear comprising:
    (a) a hat to be worn on the head, said hat comprising of an internal surface and an external surface, and a front portion and a rear portion:
    (b) at least one slit opening in the hat, said slit opening to receive for insertion the article to be secured, and
    (c) an internal securing means for securing the article received by and inserted through the slit opening in the hat, thereby securing the article to the hat, said internal securing means affixed to the internal surface of the hat, wherein the internal securing means is comprised of a sufficient amount of an internal lining comprised of buckram.

2. Headwear for securing articles, the headwear comprising:
    (a) a hat to be worn on the head, said hat comprising of an internal surface and an external surface, and a front portion and a rear portion;
    (b) at least one slit opening in the hat, said slit opening to receive for insertion the article to be secured, and
    (c) an internal securing means for securing the article received by and inserted through the slit opening in the hat, thereby securing the article to the hat, said internal securing means affixed to the internal surface of the hat, wherein the internal securing means is comprised of a sufficient amount of an internal lining comprised of neoprene.

3. Headwear for securing articles, the headwear comprising:
    (a) a hat to be worn on the head, said hat comprising of an internal surface and an external surface, and a front portion and a rear portion;

(b) at least one slit opening in the hat, said slit opening to receive for insertion the article to be secured, and (c) an internal securing means for securing the article received by and inserted through the slit opening in the hat, thereby securing the article to the hat, said internal securing means affixed to the internal surface of the hat, wherein the internal securing means is comprised of two strips of hook and loop fasteners, said hook and loop fastener strips affixed to the internal surface of the hat on each side of the slit opening, whereby the hook and loop fasteners, when compressed around the article inserted through the slit opening, secures the article to the hat.

4. Headwear for securing eyeglasses, the headwear comprising of:

(a) a hat to be worn on the head, said hat comprising of an internal surface and an external surface, and a crown comprising of front portion and a rear portion;

(b) two slit openings in the front portion of the crown to receive the insertion the temples of the eyeglasses for securing the eyeglasses above a forehead when the hat is worn normally; and (c) an internal securing means for readily securing the temples of the eyeglasses received by and inserted through the slit openings in the front portion of the crown of the hat, thereby securing the eyeglasses to the hat above a forehead.

5. The headwear according to claim 4, in which the internal securing means is comprised of a sufficient amount of an internal lining comprised of a semi-rigid but flexible material, affixed to the internal surface of the crown portion of the hat circumferentially around the slit opening in the crown portion, with said internal lining containing a corresponding slit opening that is geometrically aligned with the slit opening in the hat, whereby the internal lining clamps down on the temples of the eyeglasses when inserted, thereby securely attaching the eyeglasses to the exterior of the hat.

6. The headwear according to claim 5, wherein the internal lining affixed to the internal surface of the hat extends at least one inch in a radial direction from the slit opening in the lining.

7. The headwear according to claim 5, wherein the internal lining consists of buckram.

8. The headwear according to claim 6, wherein the internal lining consists of buckram.

9. The headwear according to claim 5, wherein the internal lining consists of neoprene.

10. The headwear according to claim 6, wherein the internal lining consists of neoprene.

11. The headwear according to claim 5, wherein the internal lining is composed substantially entirely of stretch fabric.

12. The headwear according to claim 6, wherein the internal lining is composed substantially entirely of stretch fabric.

13. The headwear according to claim 4, wherein the internal securing means is comprised of two strips of hook and loop fasteners said hook and loop fastener strips affixed to the internal surface on the crown portion of the hat on each side of the slit opening, whereby the hook and loop fastener strips, when compressed around the temples of the eyeglasses inserted through the slit openings, secures the temples of the eyeglasses to the hat.

14. Headwear for securing eyeglasses, the headwear comprising of:

(a) a hat to be worn on the head, said hat comprising of an internal surface and an external surface, and a crown comprising of front portion and a rear portion;

(b) two slit openings in the rear portion of the crown to receive for insertion the temples of the eyeglasses for securing the eyeglasses above a forehead when the hat is worn backwards; and (c) an internal securing means for readily securing the temples of the eyeglasses received by and inserted through the slit openings in the rear portion of the crown of the hat, thereby securing the eyeglasses to the hat above a forehead.

15. The headwear according to claim 14, in which the internal securing means is comprised of a sufficient amount of an internal lining comprised of a semi-rigid but flexible material, affixed to the internal surface of the crown portion of the hat circumferentially around the slit opening in the crown portion, with said internal lining containing a corresponding slit opening that is geometrically aligned with the slit opening in the hat, whereby the internal lining clamps down on the temples of the eyeglasses when inserted, thereby securely attaching the eyeglasses to the exterior of the hat.

16. The headwear according to claim 15, wherein the internal lining affixed to the internal surface of the hat extends at least one inch in a radial direction from the slit opening in the lining.

17. The headwear according to claim 15, wherein the internal lining consists of buckram.

18. The headwear according to claim 16, wherein the internal lining consists of buckram.

19. The headwear according to claim 15, wherein the internal lining consists of neoprene.

20. The headwear according to claim 16, wherein the internal lining consists of neoprene.

21. The headwear according to claim 15, wherein the internal lining is composed substantially entirely of stretch fabric.

22. The headwear according to claim 16, wherein the internal lining is composed substantially entirely of stretch fabric.

23. The headwear according to claim 14, wherein the internal securing means is comprised of two strips of hook and loop fasteners, said hook and loop fastener strips affixed to the internal surface on the crown portion of the hat on each side of the slit opening, whereby the hook and loop fastener strips, when compressed around the temples of the eyeglasses inserted through the slit openings, secures the temples of the eyeglasses to the hat.

24. The headwear as in any one of the preceding claims, wherein the hat is a baseball style cap.

25. The headwear as in anyone of the preceding claims, except claim 24, wherein the hat is a bucket style hat.

26. The headwear according to claim 4, in which the internal securing means is affixed to the internal surface of the hat circumferentially around the slit opening in the hat, with said internal lining containing a corresponding slit opening that is geometrically aligned with the slit opening in the hat, whereby the internal lining clamps down on the portion of the article inserted, thereby securely attaching the article to the exterior of the hat.

27. The headwear according to claim 26, wherein the internal lining affixed to the internal surface of the hat extends at least one inch in a radial direction from the slit opening in the lining.

28. The headwear according to claim 2, in which the internal securing means is affixed to the internal surface of the hat circumferentially around the slit opening in the hat, with said internal lining containing a corresponding slit opening that is geometrically aligned with the slit opening in the hat, whereby the internal lining clamps down on the portion of the article inserted, thereby securely attaching the article to the exterior of the hat.

29. The headwear according to claim 28, wherein the internal lining affixed to the internal surface of the hat extends at least one inch in a radial direction from the slit opening in the lining.

* * * * *